March 3, 1964 — J. J. ROOT — 3,122,776
ANIMAL STUNNER
Filed June 30, 1960
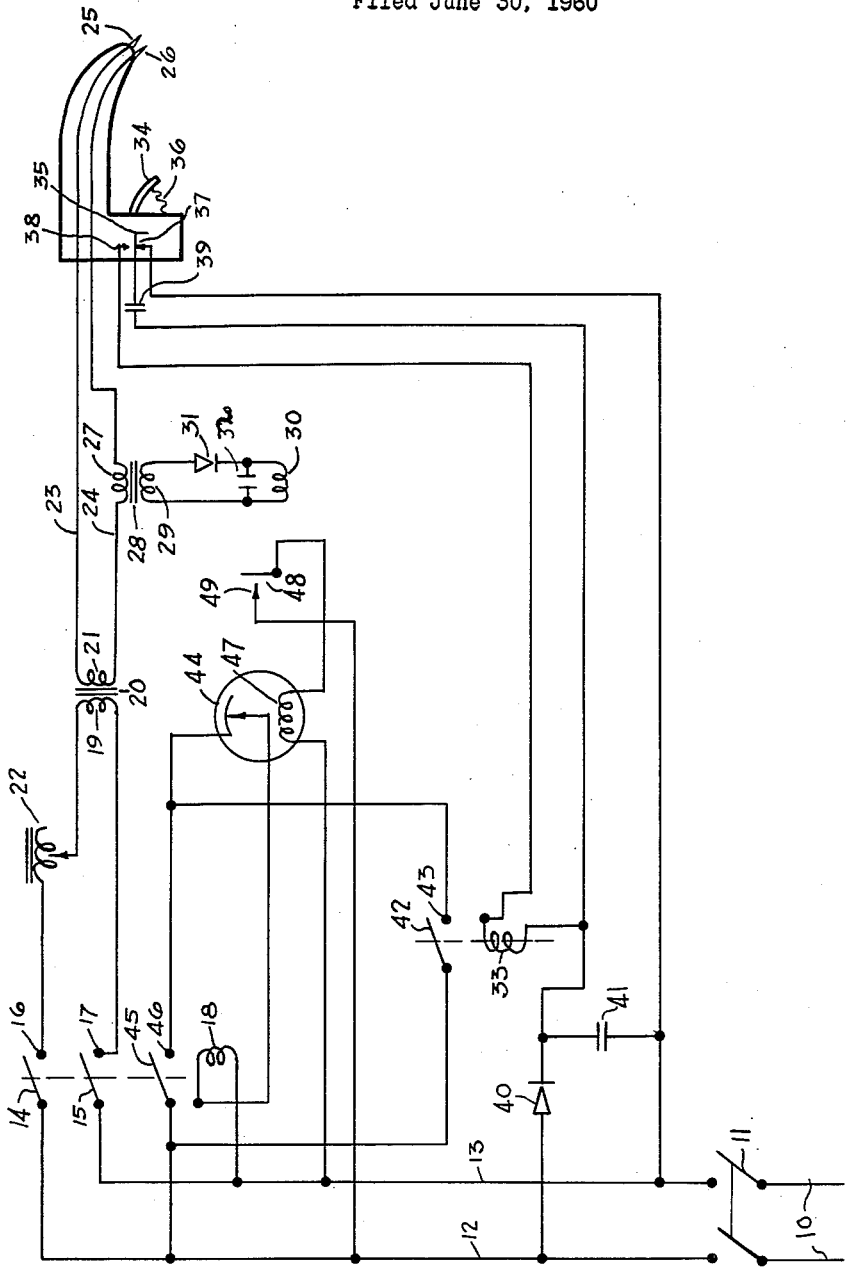
INVENTOR
JOHN J. ROOT
BY Krazinski & Nolan
ATTORNEYS

United States Patent Office 3,122,776
Patented Mar. 3, 1964

3,122,776
ANIMAL STUNNER
John J. Root, New York, N.Y.
(2475 Palisades Ave., Bronx 63, N.Y.)
Filed June 30, 1960, Ser. No. 39,998
8 Claims. (Cl. 17—1)

This invention relates to apparatus for stunning animals prior to slaughtering.

Effective July 1, 1960, all meats supplied to any agency of the United States Government must comply with the provisions of the Federal Humane Slaughtering Act. That act specifies that, with the exception of animals slaughtered in accordance with the established ritual of a religious sect, animals must be rendered insensible to pain before they are dispatched (7 U.S.C. 1902). In addition to the Federal statutes, a number of States have already enacted humane slaughtering laws and other States are preparing similar legislation.

In accordance with this invention, animals are rendered insensible to pain prior to slaughtering in a manner which fully complies with the requirements of the Federal Humane Slaughtering Act. This pain insensibility is effected by a high voltage current applied to the animal's head so that the current is transmitted to the brain. It requires approximately one-half second to stun a hog by the apparatus of this invention. In the case of hogs, the ideal time for dispatch is 4 to 10 seconds after stunning and it is possible to stun and slaughter up to 650 hogs an hour by the practice of this invention.

The animal stunner of this invention utilizes a pair of electrodes adapted for application to the epithelium of an animal, connecting means to connect the electrodes to a source of power, while disconnecting means disconnect the electrodes from the source after a predetermined period. A high potential is applied to the electrodes and the electrodes when connected with the epithelium of an animal, form a circuit which stuns the animal. Whether the high potential is applied to the electrodes before or after the electrodes are contacted with the epithelium of the animal, the period of time during which the current passes through the animal is the same. This duration may be effected by a variable timer which is responsive to the passage of current through the electrodes and which actuates the disconnecting means after a predetermined period. The actuation of a switch starts the stunning apparatus to connect the source of power with the electrodes and means are also provided for rendering the switch ineffective after actuation until after the passage of the predetermined period. The inactivation of the switch after actuation insures the application of a uniform shock to each animal for the predetermined duration. Until the current passes through an animal for that fixed period, the apparatus cannot be operated by the actuation of the switch.

An object of this invention is to render an animal insensible to pain prior to slaughtering.

Another object of this invention is to slaughter animals in a humane manner effectively and economically.

A more comprehensive understanding of this invention is obtained by reference to the accompanying drawing which shows a specific embodiment of the circuit of the animal stunner of this invention.

In the drawing, a source of power, such as that supplied by a 110 volt 60 cycle alternating current line 10, is connected through a manually operated double throw switch 11 to a pair of wires 12, 13. When the switch 11 is thrown, the current passes through armatures 14 and 15, when activated, and their respectively associated make contacts 16 and 17 of a power relay 18 to a primary 19 of a transformer 20.

A secondary 21 of the transformer 20 has sufficient turns to step up the current from 110 volts to approximately 1000 volts. A variable inductance 22 is interposed in the line leading to the primary 19 to adjust and vary the potential of the secondary winding 21. A pair of wires 23 and 24 lead from the secondary 21 and terminate respectively in a pair of separated electrodes 25 and 26 adapted for application or insertion on or into the epithelium of an animal. Desirably, these electrodes have sharp points for penetration and insuring good contact in the head of the animal. A primary 27 of a transformer 28 is interposed in the line 24 of the circuit of the secondary 21 of the transformer 20. A secondary 29 of the transformer 28 is connected to a relay coil 30 through a rectifier filter circuit comprising a rectifier 31 and a capacitance 32. The passage of a current through the secondary 29 energizes the relay coil 30 to terminate after a predetermined time, as later described, the passage of current through the secondary 21 of the transformer 20.

The power relay 18 is actuated by the energization of another relay 33 which, in turn, responds to the movement of a manually operated trigger 34 controlling the movement of an armature 35. The armature 35 by virtue of a spring 36 attached to the trigger 34 is normally engaged with a break contact 37 and disengaged from a make contact 38. A capacitance 39 is normally charged through the armature 35 and break contact 37 from the source 10, the double throw switch 11 and the pair of wires 12, 13 and a rectifier filter circuit comprising the rectifier 40 and capacitance 41. The capacitance 39 in the specific embodiment has a capacity of 20 mf.

When the switch 11 connects the source 10 to the lines 12 and 13, the capacitance 39 is being constantly charged from the source. When the trigger 34 is actuated, the armature 35 disengages from the break contact 37 and engages the make contact 38. This action discharges the capacitance 39 through the relay 33. The momentary energization of relay 33 results in the engagement on an armature 42 with an associated make contact 43 of that relay. This engagement of the armature 42 and the make contact 43 results in the energization of power relay 18 from line 13, the winding of power relay 18 through a timer 44, make contact 43, armature 42 and line 12 to the source of power 10. The actuation of relay 18 results in the engagement of armatures 14 and 15 with their respectively associated make contacts 16 and 17 to connect the power source 10 to the primary 19 of the transformer 20. In addition, the energization of power relay 18 actuates another armature 45 of that relay to engage an associated make contact 46 to lock that relay in its energized position through the circuit from line 12, armature 45, make contact 46, timer 44, winding of relay 18 to line 13. The timer 44 comprises a coil 47 which when energized breaks the locking circuit after a preset period of time. The coil 47 is connected through the engagement of an armature 48 and a make contact 49 of relay 30 to the source of power through lines 12 and 13. When relay 30 is energized by the passage of current through the circuit of the secondary 21 of transformer 20, armature 48 engages make contact 49 and the timer 44 commences to operate. A predetermined period thereafter, the timer 44 breaks the locking circuit comprising the timer 44, armature 45 and make contact 46 and power relay 18 becomes deenergized. The armatures 14, 15 and 45 disengage from their respectively associated make contacts 16, 17 and 46, and the circuit returns to the state that existed before the actuation of the trigger 34.

The animal stunner, the circuit for which is shown in the drawing, is set in operation by throwing the double throw switch 11 to connect the source of power from the 110 volt 60 cycle alternating current of line 10 to the lines 12 and 13. This action sets in motion the charging of condenser 39 through the armature 35 and break contact 37. The condenser continues to be charged constantly until the trigger 34 is pulled. The pulling of the trigger 34 disengages the armature 35 from the break contact 37 and engages the armature 35 with the make contact 38. This latter action results in the discharge of condenser 39 through the windings of relay 33 to engage the armature 42 of that relay with its respectively associated make contact 43 to complete a circuit through the timer 44 with the lines 12 and 13 to energize power relay 18. The energization of power relay 18 results in the engagement of the three armatures 14, 15 and 45 of that power relay with their respectively associated make contacts 16, 17 and 46. The engagement of armature 45 with its make contact 46 locks the circuit for the energization of relay 18 through the timer 44. The actuation of armatures 14 and 15 to engage their associated make contacts 16 and 17 effectuates a potential of approximately 800 volts across the primary winding 19 of the transformer 20. No current passes through the circuit comprising the secondary winding 21 of the transformer 20 unless and until a circuit is completed through the electrodes 25 and 26. If these electrodes are applied to the epithelium of the animal before the trigger 34 is applied, a high voltage current of the order of 1000 volts passes substantially immediately through the electrodes upon the pulling of the trigger 34. On the other hand, if the trigger 34 is pulled prior to the application of the electrodes to the epithelium of an animal, current does not pass through the circuit comprising the secondary 21 of the transformer 20 until the electrodes 25 and 26 are applied to the animal. When, and only when, a current passes through the circuit comprising the secondary 21 is the timer 44 actuated for the restoration of the circuit to its condition for the stunning of another animal. Prior to the stunning operation, the timer 44 is set for the predetermined duration desired for the passage of current through the animal. The passage of current through the circuit comprising the secondary 21 energizes relay 30 to start the timer by the engagement of the armature 48 of relay 30 with its make contact 49. A predetermined period for which the timer 44 is set after the first surge of current through the circuit comprising the secondary 21, the locking circuit through armature 45 and make contact 46 is broken to deenergize power relay 18 and place the stunning circuit in condition for application to another animal.

In the circuit shown in the drawing, after the trigger 34 is depressed, the high voltage current must pass through the electrodes and a predetermined period must elapse after the initial surge of current through the electrodes before the cycle can be repeated. This is so regardless of when or for how long the trigger 34 is depressed. The potential applied at the electrodes may be varied by adjusting the variable inductance 22 and the timer 44 may be preset to accommodate the stunning of animals of different weights. One-half second is satisfactory for the stunning of hogs.

What is claimed is:
1. An animal stunner comprising a pair of electrodes adapted for application to the epithelium of an animal, means for applying a high potential to said electrodes, and means responsive to the passage of current through said pair of electrodes for terminating the passage of current therethrough after a predetermined period.

2. An animal stunner comprising a pair of electrodes adapted for application to the epithelium of an animal, applying means for applying a potential to said electrodes, actuating means for actuating said applying means, and means for preventing said actuating means from effecting said applying means until current passes through said electrodes for a predetermined period.

3. An animal stunner comprising a source of power, a capacitance, means for charging said capacitance from said source, a transformer having a primary and secondary, means for discharging said charge on said capacitance, means responsive to said discharge for connecting said source to said primary, a pair of electrodes adapted for application to the epithelium of an animal connected to said secondary, and means responsive to the energization of said secondary for disconnecting said source from said primary after a predetermined period.

4. An animal stunner comprising a pair of electrodes adapted for application to the epithelium of an animal, a switch and means responsive to the actuation of said switch and the passage of current through said electrodes for maintaining passage of current through said electrodes for a predetermined period.

5. An animal stunner comprising a pair of electrodes adapted for application to the epithelium of an animal, a source of current, a switch, connecting means responsive to the actuation of said switch for connecting said source to said electrodes and means for rendering ineffective said switch for a predetermined period after current commences to pass through said electrodes.

6. An animal stunner comprising a pair of electrodes adapted for application to the epithelium of an animal, a source of current, a switch, connecting means responsive to the activation of said switch for connecting said source to said electrodes, means responsive to the passage of current through said electrodes for limiting the time of such passage for a predetermined period and means for rendering said switch ineffective until after said predetermined period.

7. An animal stunner comprising a source of power, a capacitance, means for charging said capacitance from said source, a relay, actuating means for discharging said capacitance to energize said relay, a pair of electrodes adapted for application to the epithelium of an animal, means responsive to the energization of said relay for imparting a high potential to said electrodes from said source, means responsive to the passage of current through said electrodes for the removal of said potential a predetermined period after such passage of current through said electrodes.

8. An animal stunner comprising a source of power, a capacitance, connecting means for connecting said source of power with said capacitance to charge said capacitance, a first relay, a power relay responsive to the actuation of said first relay, a trigger for releasing the charge on said capacitance to energize said first relay, an armature responsive to the energization of said power relay for locking the circuit for the energization of said power relay from said power source, a transformer having a primary and secondary, a pair of armatures responsive to the energization of said power relay for connecting said source of power to the primary of said transformer, a pair of electrodes adapted for application to the epithelium of an animal connected to the secondary of said transformer and for completing the circuit comprising said secondary when applied to the epithelium of an animal, a third relay in said secondary circuit and actuated by the passage of current through said secondary circuit, and a variable timer responsive to the actuation of said third relay for breaking after a predetermined period the locking circuit for the energization of said power relay.

References Cited in the file of this patent
UNITED STATES PATENTS

| | | |
|---|---|---|
| 2,253,315 | Andrus | Aug. 19, 1941 |
| 2,501,274 | Hamilton | Mar. 21, 1950 |
| 2,827,056 | Degelman | Mar. 18, 1958 |
| 2,977,627 | Morse et al. | Apr. 4, 1961 |

FOREIGN PATENTS

| | | |
|---|---|---|
| 567,355 | Germany | Dec. 30, 1932 |